Oct. 28, 1969    R. A. WALLER    3,474,631
BERTHING OF SHIPS

Filed Nov. 13, 1967    3 Sheets-Sheet 1

Oct. 28, 1969  R. A. WALLER  3,474,631
BERTHING OF SHIPS

Filed Nov. 13, 1967  3 Sheets-Sheet 2

Oct. 28, 1969   R. A. WALLER   3,474,631
BERTHING OF SHIPS
Filed Nov. 13, 1967   3 Sheets-Sheet 3

INVENTOR
ROY A. WALLER
BY
Holcombe, Wetherill & Brisebois
ATTORNEYS

United States Patent Office 3,474,631
Patented Oct. 28, 1969

3,474,631
BERTHING OF SHIPS
Roy A. Waller, Carshalton, England, assignor to
Kins Developments Limited
Filed Nov. 13, 1967, Ser. No. 682,313
Claims priority, application Great Britain, Nov. 17, 1966, 51,636/66
Int. Cl. E02b 3/22; B63b 21/04
U.S. Cl. 61—48                            10 Claims

ABSTRACT OF THE DISCLOSURE

A docking fender which is movable up an inclined support to absorb the kinetic energy of a berthing vessel.

---

This invention is concerned with improvements in and relating to quays for berthing waterborne vessels.

Quays have been proposed which comprise a platform mounted upon piles so arranged that if a vessel during docking comes into contact with the quay, the piles absorb the kinetic energy of the moving vessel and arrest the vessel. Alternatively fender devices may be located on the seaward side of a quay to absorb kinetic energy.

According to the present invention there is provided a docking fender comprising a mass supported on one or more inclined support surfaces so as to be movable with a vertical component against gravity and with a horizontal component and a fender portion projecting from the dock when the mass is at rest in its lowermost position, the arrangement being such that a vessel approaching the dock will engage the fender portion and any residual kinetic energy of the vessel will be transferred to the mass by the fender and be transformed to potential energy, thereby the approach motion of the vessel being arrested.

The mass may be supported on one or more bearing surfaces each slidably engaging a load bearing surface of the support or the mass may be supported by rotatable elements on the mass and/or the support. When the mass is supported slidably one or both of the mating surfaces may be of polytetrafluorethylene.

In order that the invention may be well understood there will now be described some embodiments thereof, given by way of example only, reference being had to the accompanying drawings in which.

The quay shown in FIGURES 1 to 4 is designed particularly for berthing large tankers and comprises a support 1 mounted on piles 2, the support having mass-supporting surface inclined to the horizontal and facing the bottom surface of a mass, in this embodiment in the form of a tank 3, for example of concrete, filled with ballast such as mud. The tank is slidably carried on the support and the seaward side of the tank normally projects from the support constituting a fender portion preferably provided with protective resilient fenders 4. If a vessel engages the fender portion during approach to the quay, the kinetic energy of the vessel will be converted to potential energy because the mass will be moved up the surface of the support.

Figure 3:
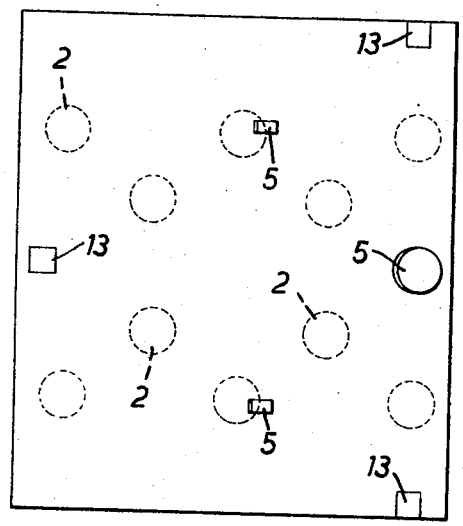
FIGURE 3 is a section along the line B—B of FIGURE 1.
Figure 4:
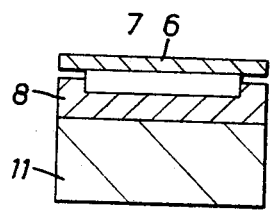
FIGURE 4 is a section through a bearing.

To provide for the sliding motion of the mass on the support, the support is provided with a plurality of bearings 5, preferably three to prevent rocking, each having an upper disc of, for example, polytetrafluorethylene on each of which bears a plate, for example of stainless steel, on the underside of the mass. Such a bearing is shown in FIGURE 4 where the stainless steel plate 6 is provided on the mass and rests on a polytetrafluorethylene disc 7 set in a steel block 8 on the support. Alternatively the bearings could be Rotaflon bearings made by the Andre Rubbe Co., Ltd. The bearings may conveniently, as shown in FIGURE 3, comprise a main bearing on the centre line and two subsidiary bearings.

The embodiment described can be designed to cater for the berthing of tankers of 160,000 tons which during berthing manoeuvres may have a kinetic energy of the order of 750 ft. tons. By adoption of a mass of 500 tons and an angle of inclination of 18° complete absorption of 750 ft. tons can be effected with a horizontal displacement of 4.5 ft. of the mass. To effect this displacement a force of 167 tons will be developed to be resisted by the piles. To effect absorption of a similar value of kinetic energy by means of a compressible fender would require a displacement of the order of 3 ft. producing a horizontal force of 340 tons to be resisted by the piles. It will be seen therefore that the uplift and horizontal force exerted on the piles will be substantially less in the case of the sliding mass, the former in part due to the mass, and hence the capital cost of the quay will be reduced.

To protect the bearings the stainless steel plates are preferably set in channels 10 in the bottom of the tank and the polytetrafluorethylene members and their support members 11 are received in the channels. To guide the mass, guideways may be provided in the support engaging the sides of the tank, but as an alternative one or more of the members 11 supporting the bearing blocks and discs may be formed as a guide rib engaging the associated channel 10 on the underside of the tank. If necessary additional bearing discs and plates may be provided on the laterally opposed faces of the member and channel. Whether or not the members 11 form guides one or more of those members may constitute or carry at the upper end a buffer for engagement with the tank for arresting the tank at the lowermost position.

The tank being massive, it may be desirable to cast the tank in situ above the support, but clear of the bearings and members 11 on the support. Accordingly jack plates 12 may be cast into the tank and plates 13 set in the support so that when cast the tank can be carried by three jacks which will support it during the removal of the shuttering and thereafter the supporting packs will be operated to lower the tank on to the bearings. The jacks can then be removed. If it becomes necessary to reraise the tank for access to the bearings this can be effected by repositioning the jacks between the jack plates.

A ship may not be parallel to the quay at the moment when the ship engages the quay, in which case the forces acting on the ship's structure will be localised and may be excessive. Accordingly in a modification of the above arrangement the mass may be mounted on the support 1 for pivotal as well as sliding movement member 14 FIGURE 5 extending from the support and engaging a groove 10 on the underside of the mass, the member 14 would carry the main bearings 5 supporting the mass and sufficient clearance would be provided at the subsidiary bearings to allow pivoting.

Figure 5:
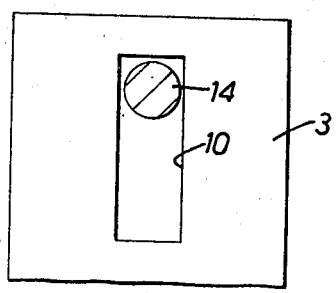
FIGURE 5 is a horizontal section of a guide arrangement.
Figure 6:
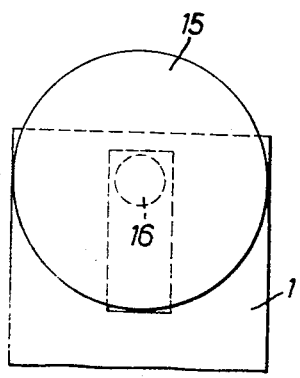
FIGURE 6 is a plan view of another embodiment of quay.

As a modification of the fender of FIGURE 5, there is shown in FIGURE 6 an arrangement suitable for use with small ships and including a freely rotatable cylindrical fender mass 15 having extending downwardly therefrom a cylindrical tongue 16 which carries main bearings 5 and which is located in a groove in the support 1 to permit sliding of the mass 3 relative to the support.

Figure 1:
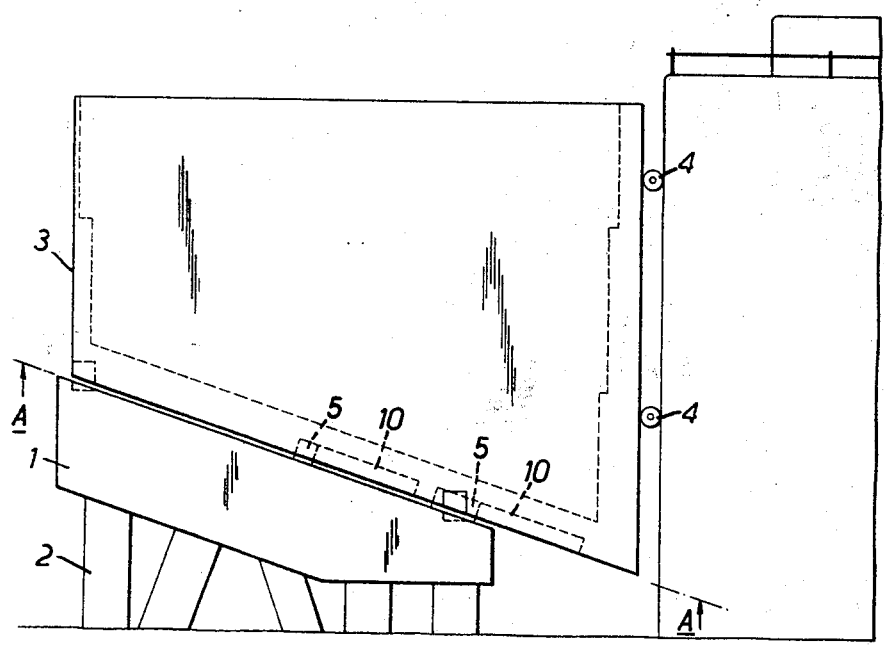
FIGURE 1 is an end elevation of a ship and a quay according to the invention.
Figure 2:
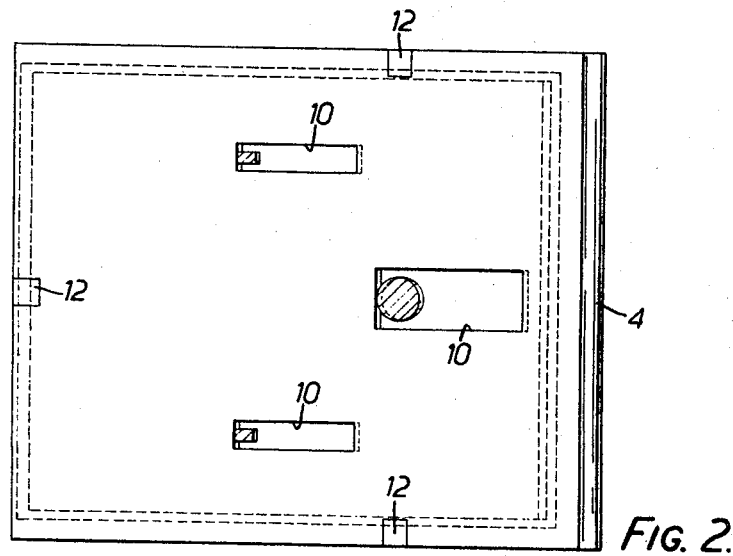
FIGURE 2 is a section along the line A—A of FIGURE 1.
Figure 7:
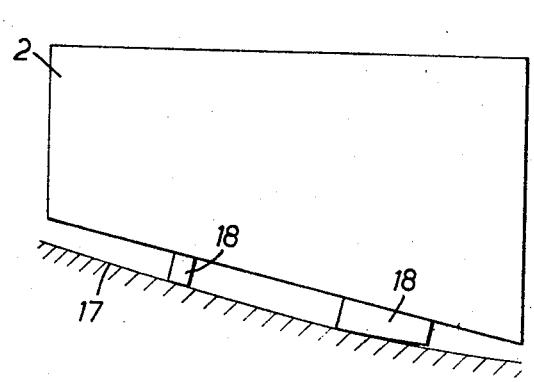
FIGURE 7 is an end elevation of a further embodiment of quay.

Furthermore the quay may be required to cater for ships of various sizes in which case the arrangement of FIGURE 7 which is a modification of the fender shown in FIGURES 1 to 3, may be adopted where the displacement of the mass requires progressively more work for each unit of horizontal displacement. As shown a curved support surface 17 may be adopted and three bearing feet 18 on the mass as opposed to the support. Whichever part carries the bearings a degree of rotation of the bearing surface relative to its carrier will be desirable so that the discs remain in overall contact with the plate 5. Other surface shapes could be adopted than that shown to provide the characteristic of variable energy absorption per unit distance of displacement.

Figure 8:
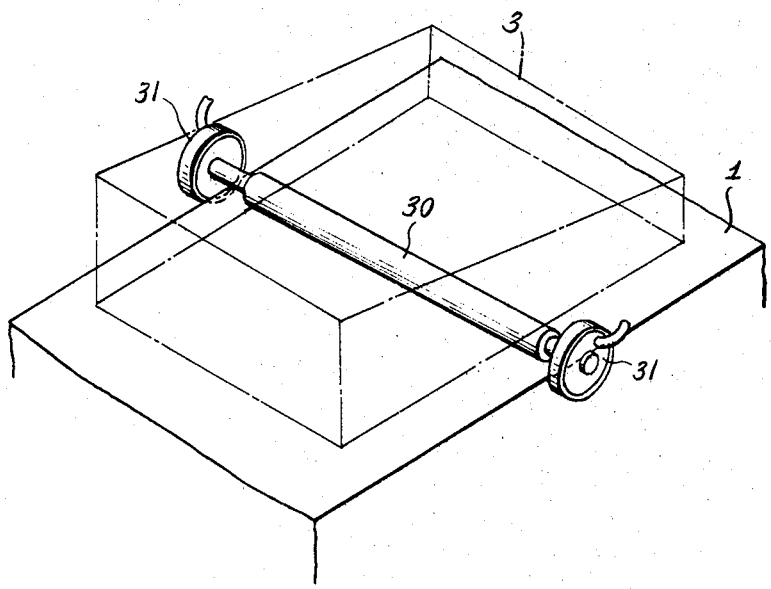
FIGURE 8 shows diagrammatically a roller and brake assembly for the mass.

The invention could be adapted with advantage in certain cases by using material with a higher coefficient of friction for the meeting surfaces of the fender mass and support. Additional energy would then be absorbed by sliding friction, thus reducing the mass required. Provided that the frictional force was less than the gravitational restoring force then the fender mass would still return to its original position. It is clear that where a coefficient of friction is sufficiently high to absorb a significant amount of energy, it must be controllable at a known value and be suitable within the marine environment. The "sliding" supports with low or with high coefficients of friction could be provided in other ways; for example, the mass 3 could be supported on rollers 30 (see FIGURE 8) provided on the support 1; the rollers 30, only one of which is shown, could be used with disc brakes 31 and could be rubber coated with or without high hysteresis.

The invention is applicable to solid quays, that is to say those which are founded on the bottom, or to quays supported on piles, or for example to fixed facilities such as bunkering or off-shore loading facilities to which a ship must approach closely and moor or dock against but which do not constitute true quays or berths.

By adoption of a steady incline of the support surface then the arrangement according to this invention gives a lowest possible and constant maximum force for displacement of the mass as against a resilient fender where the force developed will increase with increase of energy to be absorbed. Furthermore with the present invention using a tank, the mass may be varied, and hence the displacement. If, however, the mass can be predetermined and will require no alteration, the mass may be constituted solely by concrete instead of in the form of a tank.

I claim:
1. In combination with a dock having an upper supporting surface which is inclined to the horizontal, a mass having a bottom surface facing said supporting surface, and anti-friction means between said surfaces for enabling said mass to move over said supporting surface with a vertical component against gravity and with a horizontal component, said mass having a main portion overlying said dock and a fender portion projecting beyond a side of the dock when the mass is at rest in its lowermost position so that a vessel approaching said side of the dock will engage the fender portion to cause said movement of the mass, the incination of said supporting surface being such that the bulk of the kinetic energy transferred to the mass from the vessel is transformed into potential energy in the mass to arrest the motion of the vessel.

2. A docking fender according to claim 1 in which the path of the mass has a non-linear gradient.

3. A docking fender according to claim 1 in which the mass is mounted for pivotal movement relative to said supporting surface to allow the mass and fender portion to take up the attitude of the vessel relative to the dock.

4. A docking fender according to claim 1 in which the fender portion presents a curved surface to an approaching vessel.

5. A docking fender according to claim 1 in which the mass is guided relative to the surface by a spigot and groove connection therebetween.

6. A docking fender according to claim 1 in which the mass is supported frictionally on the surface.

7. A docking fender according to claim 1 in which the mass is supported on said supporting surface by rotatable members to which a braking force is applied.

8. A docking fender according to claim 1 in which the fender portion includes one or more resilient fender elements for engagement by an approaching ship.

9. A docking fender according to claim 1 in which the mass is formed by a tank containing ballast.

10. A docking fender according to claim 1 in which at least one of said surfaces is coated with polytetrafluoroethylene.

References Cited

UNITED STATES PATENTS

| | | | |
|---|---|---|---|
| 1,347,389 | 7/1920 | Larsen | 61—48 X |
| 2,892,315 | 6/1959 | Blancato | 61—48 |
| 3,254,491 | 6/1966 | Levinton | 61—48 |

JACOB SHAPIRO, Primary Examiner

U.S. Cl. X.R.

114—219, 220